(12) United States Patent
Mahendran et al.

(10) Patent No.: US 9,083,713 B2
(45) Date of Patent: Jul. 14, 2015

(54) APPARATUS AND METHOD FOR PROVIDING MOBILITY TO IMS SESSIONS IN MOBILE IP NETWORKS

(75) Inventors: Arungundram Chandrasekaran Mahendran, San Diego, CA (US); Gerardo Giaretta, San Diego, CA (US); Kalle Ilmari Ahmavaara, San Diego, CA (US); Farrokh Khatibi, San Diego, CA (US); Haipeng Jin, Carlsbad, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1405 days.

(21) Appl. No.: 12/631,382

(22) Filed: Dec. 4, 2009

(65) Prior Publication Data
US 2010/0309843 A1 Dec. 9, 2010

Related U.S. Application Data

(60) Provisional application No. 61/120,679, filed on Dec. 8, 2008.

(51) Int. Cl.
*H04W 4/00* (2009.01)
*H04L 29/06* (2006.01)
(Continued)

(52) U.S. Cl.
CPC ........ *H04L 65/1016* (2013.01); *H04L 65/1083* (2013.01); *H04W 36/0022* (2013.01); *H04W 36/14* (2013.01); *H04W 80/04* (2013.01); *H04W 80/10* (2013.01)

(58) Field of Classification Search
USPC .......................................... 370/255, 389, 328
See application file for complete search history.

(56) References Cited

U.S. PATENT DOCUMENTS

2007/0060097 A1  3/2007 Edge et al.
2007/0149172 A1* 6/2007 Dickinson ..................... 455/411
(Continued)

FOREIGN PATENT DOCUMENTS

CN  1898972 A  1/2007
CN  1943211 A  4/2007
(Continued)

OTHER PUBLICATIONS

Taiwan Search Report—TW098141925—TIPO—Sep. 13, 2013.
(Continued)

*Primary Examiner* — Dang Ton
*Assistant Examiner* — Pamit Kaur
(74) *Attorney, Agent, or Firm* — Darren M. Simon

(57) ABSTRACT

An apparatus and method for providing mobility to IMS sessions comprising connecting to an APN through a 3GPP access; determining if a non-3GPP access is available; determining if the APN is specific to an IMS application being used or desired to be used, or if an IP header of an IMS application flow matches a configured pattern; and performing one of: a) triggering an IMS Session Continuity flow through the non-3GPP access for the IMS application based on one of the following: if the APN is specific to the IMS application or if the IP header of the IMS application flow matches the configured pattern; or b) triggering an IP mobility flow through the non-3GPP access for the IMS application or a non-IMS application if the APN is not specific to the IMS application and if the IP header of the IMS application flow does not match the configured pattern.

20 Claims, 6 Drawing Sheets

(51) Int. Cl.
*H04W 36/00* (2009.01)
*H04W 36/14* (2009.01)
*H04W 80/04* (2009.01)
*H04W 80/10* (2009.01)

(56) References Cited

U.S. PATENT DOCUMENTS

| | | | |
|---|---|---|---|
| 2008/0285492 A1 | 11/2008 | Vesterinen | |
| 2009/0249406 A1* | 10/2009 | Gordon et al. | 725/62 |
| 2009/0274069 A1* | 11/2009 | Olsson et al. | 370/255 |
| 2010/0189103 A1* | 7/2010 | Bachmann et al. | 370/389 |

FOREIGN PATENT DOCUMENTS

| | | |
|---|---|---|
| EP | 1797677 A1 | 6/2007 |
| JP | 2008503108 A | 1/2008 |
| JP | 2008160791 A | 7/2008 |
| JP | 2008245216 A | 10/2008 |
| TW | M294789 U | 7/2006 |
| TW | 200715789 | 4/2007 |
| WO | 2006083039 A1 | 8/2006 |

OTHER PUBLICATIONS

International Search Report and Written Opinion—PCT/US2009/067212—ISA/EPO—Mar. 26, 2010.

Anonymous, 3GPP2-drafts, 2500 Wilson Boulevard, Suite 300, Arlington, Virginia 22201, USA, XP040488605.

Taaghol P et al, "Seamless integration of mobile WiMAX in 3GPP networks", IEEE Communications Magazine, Oct. 1, 2008 IEEE Service Center, Piscataway, US—ISSN 0163-6804, vol. 46, No. 10, pp. 74-85, XP011236262.

* cited by examiner

APPARATUS AND METHOD FOR PROVIDING MOBILITY TO IMS SESSIONS IN MOBILE IP NETWORKS

CLAIM OF PRIORITY UNDER 35 U.S.C. §119

The present application for patent claims priority to Provisional Application No. 61/120,679 entitled "Method to Provide Mobility to IMS Sessions in Mobile IP Networks" filed Dec. 8, 2008, and assigned to the assignee hereof and hereby expressly incorporated by reference herein.

FIELD

This disclosure relates generally to apparatus and methods for IP Mobility. More particularly, the disclosure relates to providing mobility to IP Multimedia Subsystem (IMS) sessions in mobile (Internet Protocol) IP networks.

BACKGROUND

In many telecommunication systems, communications networks are used to enable the transport of messages among several interacting spatially-separated devices or network nodes. Network types may be classified by different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks may also be distinguished by the switching or routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Asynchronous Transfer Mode (ATM) Ethernet, etc.).

One important characteristic of communications networks is the choice of wired or wireless transmission media among the constituents of the network. In the case of wired networks, tangible physical media such as copper wire, coaxial cable, waveguide, fiber optic cable, etc. are employed to propagate guided electromagnetic waveforms which convey message traffic over some distance. Wired networks are typically static configurations and are often favored for interconnection of fixed network elements or for bulk data transfer. For example, fiber optic cables are often the preferred transmission media for very high throughput transport applications over long distances between large network hubs, such as bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

SUMMARY

Disclosed is an apparatus and method for providing mobility to IP Multimedia Subsystem (IMS) sessions in mobile (Internet Protocol) IP networks. According to one aspect, a method for providing mobility to IP Multimedia Subsystem (IMS) sessions in a mobile (Internet Protocol) IP network, the method comprising connecting to an Access Point Name (APN) through a 3GPP access; determining if a non-3GPP access is available; determining at least one of the following: if the APN is specific to an IMS application being used or desired to be used, or if an IP header of an IMS application flow matches a configured pattern; and performing one of the following: a) triggering an IMS Session Continuity (SC) flow through the non-3GPP access for the IMS application based on one of the following: if the APN is specific to the IMS application or if the IP header of the IMS application flow matches the configured pattern; or b) triggering an IP mobility flow through the non-3GPP access for the IMS application or a non-IMS application if the APN is not specific to the IMS application and if the IP header of the IMS application flow does not match the configured pattern.

According to another aspect, a user equipment for providing mobility to IP Multimedia Subsystem (IMS) sessions in a mobile (Internet Protocol) IP network, the user equipment comprising a processor and a memory wherein the memory containing program code executable by the processor for performing the following: connecting to an Access Point Name (APN) through a 3GPP access; determining if a non-3GPP access is available; determining at least one of the following: if the APN is specific to an IMS application being used or desired to be used, or if an IP header of an IMS application flow matches a configured pattern; and performing one of the following: a) triggering an IMS Session Continuity (SC) flow through the non-3GPP access for the IMS application based on one of the following: if the APN is specific to the IMS application or if the IP header of the IMS application flow matches the configured pattern; or b) triggering an IP mobility flow through the non-3GPP access for the IMS application or a non-IMS application if the APN is not specific to the IMS application and if the IP header of the IMS application flow does not match the configured pattern.

According to another aspect, an apparatus for providing mobility to IP Multimedia Subsystem (IMS) sessions in a mobile (Internet Protocol) IP network, the apparatus comprising means for connecting to an Access Point Name (APN) through a 3GPP access; means for determining if a non-3GPP access is available; means for determining at least one of the following: if the APN is specific to an IMS application being used or desired to be used, or if an IP header of an IMS application flow matches a configured pattern; and means for performing one of the following: a) triggering an IMS Session Continuity (SC) flow through the non-3GPP access for the IMS application based on one of the following: if the APN is specific to the IMS application or if the IP header of the IMS application flow matches the configured pattern; or b) triggering an IP mobility flow through the non-3GPP access for the IMS application or a non-IMS application if the APN is not specific to the IMS application and if the IP header of the IMS application flow does not match the configured pattern.

According to another aspect, a computer-readable medium storing a computer program, wherein execution of the computer program is for: connecting to an Access Point Name (APN) through a 3GPP access; determining if a non-3GPP access is available; determining at least one of the following: if the APN is specific to an IMS application being used or desired to be used, or if an IP header of an IMS application flow matches a configured pattern; and performing one of the following: a) triggering an IMS Session Continuity (SC) flow through the non-3GPP access for the IMS application based on one of the following: if the APN is specific to the IMS application or if the IP header of the IMS application flow matches the configured pattern; or b) triggering an IP mobility flow through the non-3GPP access for the IMS application or a non-IMS application if the APN is not specific to the IMS application and if the IP header of the IMS application flow does not match the configured pattern.

Advantages of the present disclosure include one or more of enabling transfer of an IMS session from one IP address to another, enabling mobility between cellular and WLAN accesses for IMS applications and enabling session continuity of all applications that maintain valid IP addresses.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
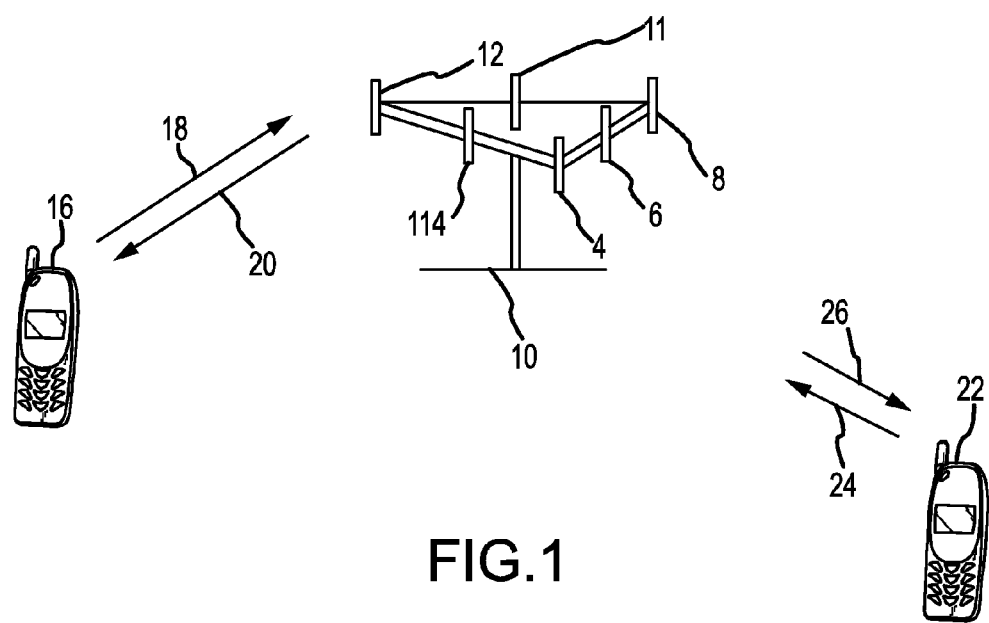
FIG. 1 illustrates an example of a multiple access wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

FIG. 1 illustrates an example of a multiple access wireless communication system. An access point 10 (AP) includes multiple antenna groups, one including 4 and 6, another including 8 and 11, and an additional including 12 and 14. In FIG. 1, only two antennas are shown for each antenna group, however, more or fewer antennas may be utilized for each antenna group. User equipment 16 (UE) is in communication with antennas 12 and 14, where antennas 12 and 14 transmit information to user equipment 16 over forward link 20 and receive information from user equipment 16 over reverse link 18. User equipment 22 is in communication with antennas 6 and 8, where antennas 6 and 8 transmit information to user equipment 22 over forward link 26 and receive information from user equipment 22 over reverse link 24. In a frequency division duplex (FDD) system, communication links 18, 20, 24 and 26 may use different frequency for communication. For example, forward link 20 may use a different frequency then that used by reverse link 18.

Each group of antennas and/or the area in which they are designed to communicate is often referred to as a sector of the access point. In the embodiment, antenna groups each are designed to communicate to user equipments in a sector, of the areas covered by access point 10.

In communication over forward links 20 and 26, the transmitting antennas of access point 10 utilize beamforming in order to improve the signal-to-noise ratio of forward links for the different user equipments 16 and 24. Also, an access point using beamforming to transmit to user equipments scattered randomly through its coverage causes less interference to user equipments in neighboring cells than an access point transmitting through a single antenna to all its user equipments.

An access point may be a fixed station used for communicating with the terminals and may also be referred to as an access node, a Node B, or some other terminology. A user equipment (UE) may also be called an access terminal (AT), a wireless communication device, terminal or some other terminology.

Figure 2:
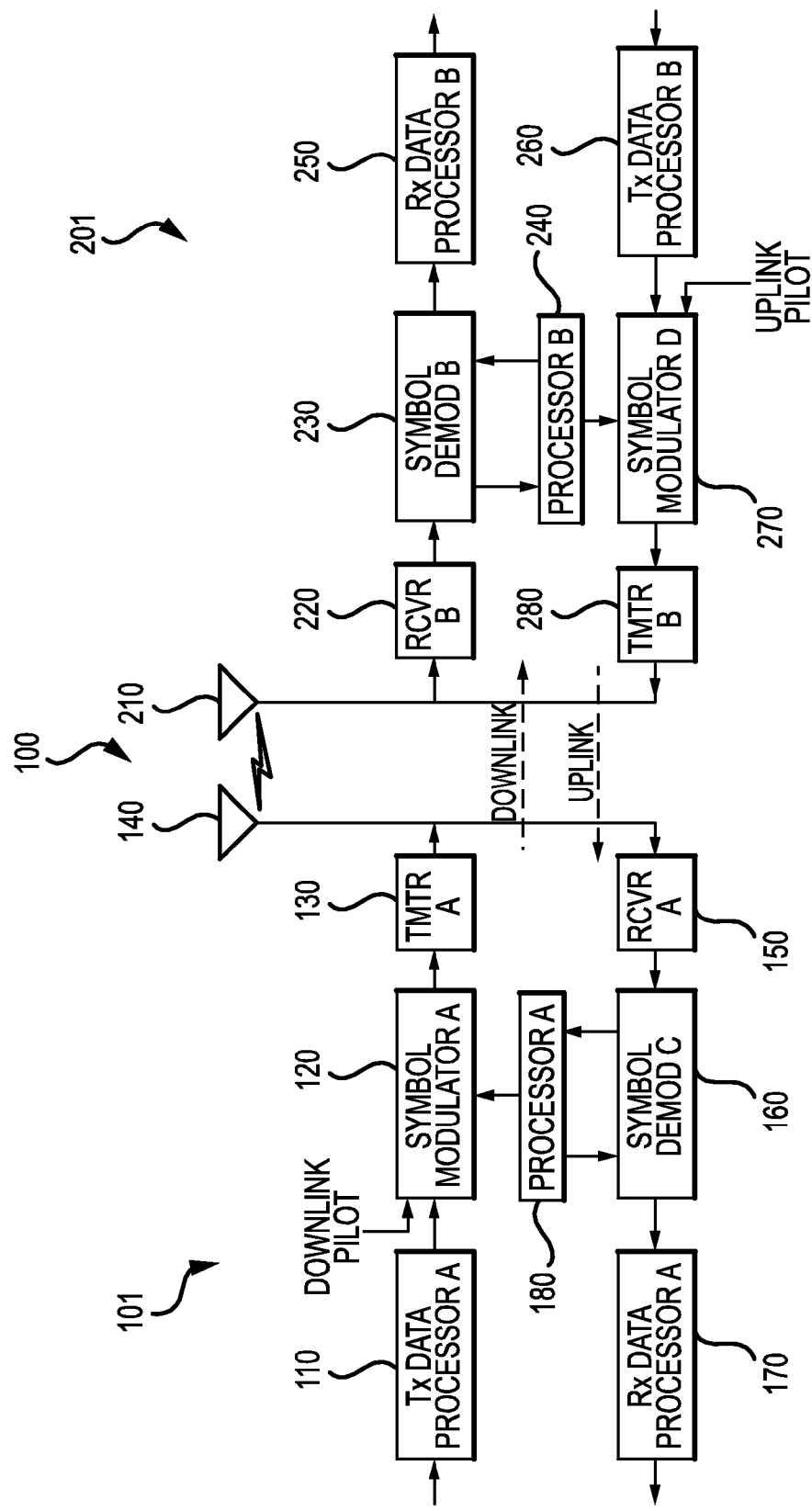
FIG. 2 illustrates an example block diagram of an access point/user equipment (UE) system.

FIG. 2 is a block diagram illustrating an example access point/UE system 100. One skilled in the art would understand that the example access point/UE system 100 illustrated in FIG. 1 may be implemented in an Frequency Division Multiple Access (FDMA) environment, an Orthogonal Frequency Division Multiple Access (OFDMA) environment, a Code Division Multiple Access (CDMA) environment, a Wideband Code Division Multiple Access (WCDMA) environment, a Time Division Multiple Access (TDMA) environment, a Space Division Multiple Access (SDMA) environment or any other suitable wireless environment.

The access point/UE system 100 includes an access point 101 (e.g., base station) and a user equipment or UE 201 (e.g., wireless communication device). In the downlink leg, the access point 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access point 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access point/UE system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

One skilled in the art would understand that the scope and spirit of the present disclosure are not affected by other examples of radio access technologies employed by other wireless systems, including but not limited to, Universal Mobile Telecommunications System (UMTS), Wideband Code Division Multiple Access (WCDMA), GSM (Global System for Mobile communications: originally from Groupe Special Mobile), GSM/GPRS/EDGE, Long Term Evolution (LTE), Long Term Evolution-Advanced (LTE-A), IS-95, CDMA2000, Evolution-Data Optimized (EVDO) or Ultra Mobile Broadband (UMB), etc.

In one aspect, wireless networks may be used for Internet Protocol (IP) applications such as IP voice telephony, messaging, file transfer, video broadcast, audio broadcast, email, etc. The Internet Protocol (IP) serves as a fundamental internetworking building block by providing a universal interworking function for a very diverse set of user applications and services which are carried by an arbitrary type of transport technology, either wired or wireless. In one example, an IP address serves as a ubiquitous identifier of IP users and network nodes. IP addresses are fundamental components of an IP datagram for identifying both a source and a destination for a particular message which has been decomposed into a plurality of datagrams.

As an extension protocol to IP, Mobile IP, also known as IP mobility, provides a networking protocol which permits mobile users to traverse various networks over time, while maintaining their permanent IP address. IP mobility employs two types of address types: a home address for identifying a permanent address for a user in its home network and a care of address (CoA) for identifying a user away from its home network.

An alternative IP mobility approach is known as Proxy Mobile IP. When Proxy Mobile IP is used, the Mobile IP client is terminated in a network entity so that the terminal does not need to be assigned addresses different from the permanent address.

IP mobility offers mobility support for all IP applications. For certain type of applications, such as IMS applications, an alternative to IP mobility is known as IP Multimedia Subsystem (IMS) Session Continuity (SC). IMS supports a multimedia service architecture using IP in wireless networks. IMS aims to facilitate network convergence using IP-based infrastructure for a variety of user applications. IMS offers many user benefits such as multimedia service integration, mobility, vendor independence, legacy network interworking, etc.

In one example, IMS is based on Internet Engineering Task Force (IETF) protocols. A fundamental protocol used in IMS is known as Session Initiation Protocol (SIP). SIP is an application layer protocol used for signaling purposes in the creation, modification, and termination of user sessions.

In one aspect, the IMS core network architecture is comprised of three layers: a Transport Layer, a Control Layer, and a Service Layer. The Transport Layer provides network access to IMS user devices such as mobile phones, personal digital assistants (PDAs), laptop computers, wired phones, IP phones, etc. User access to the Transport Layer may be through wired or wireless media. The Control Layer supports a variety of call session control functions (CSCFs). The Service Layer provides various multimedia services to end users. In one example, SIP is used as the interface between user applications and the Control Layer.

A wireless network and its devices may support both IP mobility and IMS for similar functionality. For example, IMS Session Continuity enables the transfer of an IMS session from one IP address to another. IMS may provide a full transfer (for all media) or it may provide a partial transfer (for some media). And, IMS may enable mobility between cellular and wireless local area network (WLAN) accesses for IMS applications. In another example, IP mobility may also enable session continuity of all applications by maintaining a valid IP address as seen by the applications. For example, Mobile IP may also be used for cellular to WLAN mobility.

In one example, the user equipment (UE) triggers the procedures for IP mobility and for IMS Session Continuity (SC). In the case of IP mobility, the UE sends a Binding Update (BU) per Dual Stack Mobile Internet Protocol version 6 (DSMIPv6) or indicates "Handover" in the attach procedure per Proxy Mobile Internet Protocol version 6 (PMIPv6). In the case of IMS SC, the UE sends a RE_INVITE message. In one aspect, the UE needs to know and decide if IMS SC or IP mobility procedures should be triggered when a new access is available. In one example, if IP mobility is executed, IMS SC is not performed since there is no change in the IP address.

Figure 3:
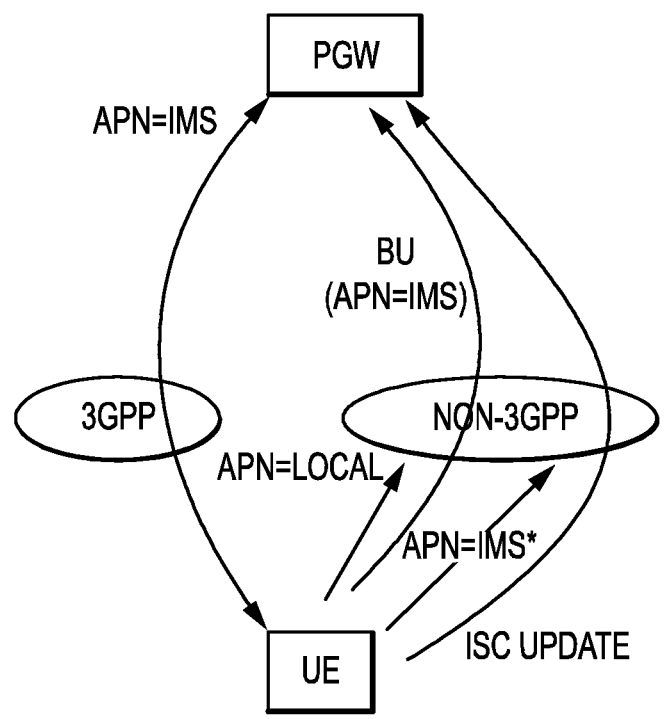
FIG. 3 illustrates an example process flow diagram with different UE mobility alternatives.

FIG. 3 illustrates an example process flow diagram with different UE mobility alternatives. In one option, a UE connects to an IMS Access Point Name (APN) via a 3GPP access. In another option, if a non-3GPP APN is available, the UE has the following three alternatives:

Alternative 1: UE uses IP Mobility, for example, the UE uses the DSMIPv6 protocol (i.e., APN=local+BU for APN=IMS), and the UE moves all or some IMS flows to the non-3GPP APN;

Alternative 2: UE uses IMS Session Continuity directly with a new IP address obtained from a new public data network (PDN) connection to the APN=IMS* (either the same APN of IMS or a decoration, i.e., a source route identifier); or Alternative 3: UE uses network based mobility (APN=IMS) and IP0 is preserved.

In one example, the process for choosing Alternative 3 is similar to that in Alternative 1. In one aspect, the Access Point Name (APN) identifies a General Packet Radio Service (GPRS) bearer service, for example, an IP connection, Wireless Application Protocol (WAP) gateway connection, short messaging service (SMS) service, etc.

Referring to FIG. 3, the UE selects between Alternatives 1 and 2; that is, the UE decides whether to perform IMS SC or IP (flow) mobility based on the APN. For example, the UE triggers IMS SC for APNs which are specific to IMS applications, and the UE triggers IP (flow) mobility for APNs which are not only associated to IMS applications.

As one example, the UE is attached to a 3GPP LTE network and is connected to two public data networks (PDNs), one to APN=IMS and the other to APN=Internet. In another example, a wireless local area network (WLAN) is also available and the UE loses 3GPP LTE coverage. In this case, the UE moves the active flows to the WLAN. In yet another example, the UE triggers two different procedures: IP Mobility and IMS SC. In this case, the UE triggers IP mobility only for the public data network (PDN) connection associated with APN=Internet. Also in this case, the UE creates a new public data network (PDN) connection to APN=IMS, obtains a new IP address, and performs IMS SC.

In one aspect, the UE is configured with the list of APNs which require IP mobility and APNs which require IMS SC to enable the UE to choose between IP mobility and IMS SC. In one example, the UE is configured by the access network discovery and selection function (ANDSF) per the 3GPP 23.402 specification. In release 8 of this specification, the ANDSF provides policies about access network selection which are used for IP mobility procedures. In one aspect, the policies could be enhanced to include the list of APNs for which the policies are valid. For example, the lack of one APN for a policy implies that the policy is not applicable to IP mobility for that APN and IP mobility should not be triggered for PDN connections to that APN.

In another aspect, the UE is configured with a new data structure. The data structure includes the list of APNs for which IMS SC should be used and the list of APNs for which IP mobility should be used.

Figure 4:
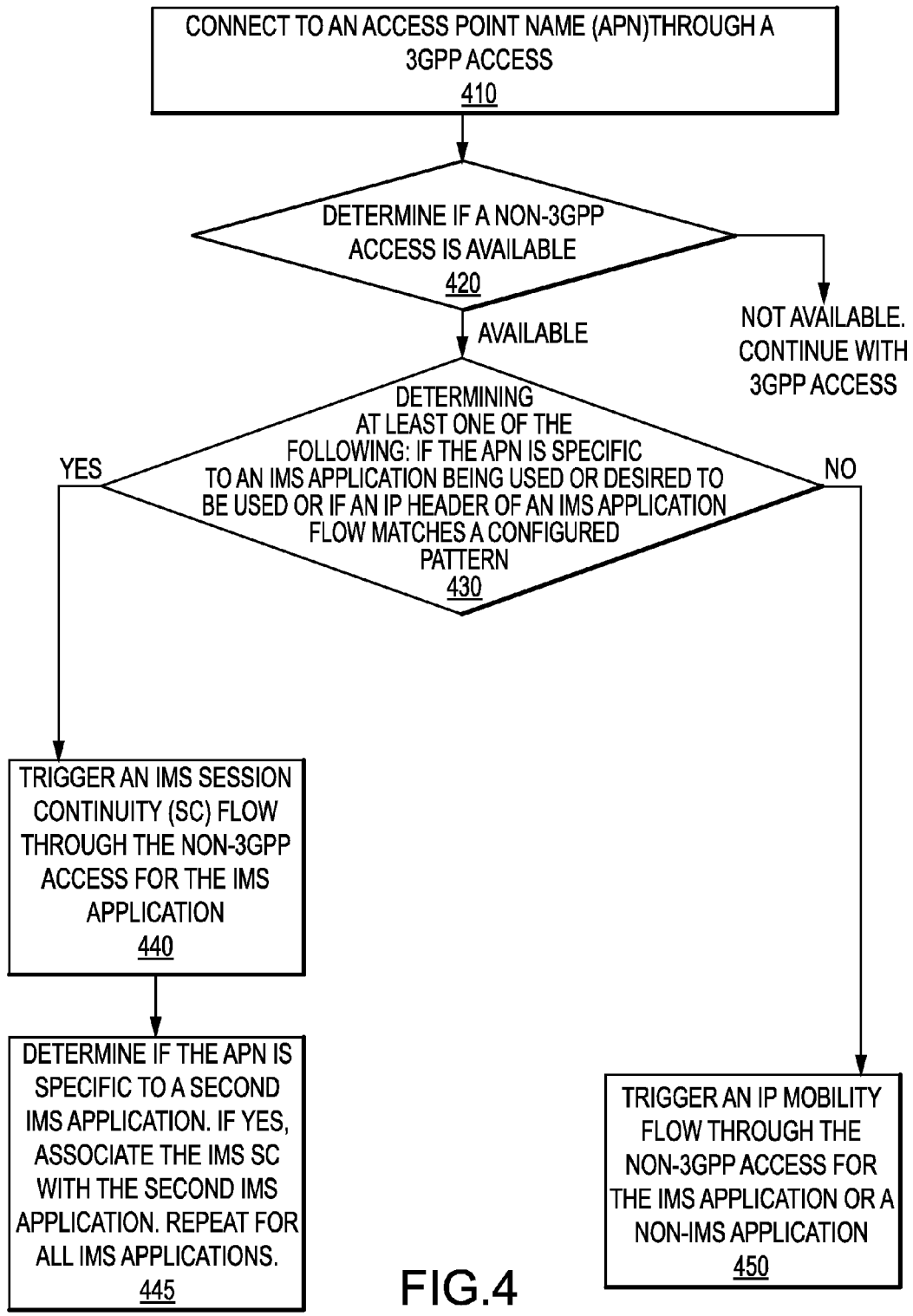
FIG. 4 illustrates an example flow diagram for providing mobility to IP Multimedia Subsystem (IMS) sessions in a mobile (Internet Protocol) IP network.

FIG. 4 illustrates an example flow diagram for providing mobility to IP Multimedia Subsystem (IMS) sessions in a mobile (Internet Protocol) IP network. In block 410, connect to an Access Point Name (APN) through a 3GPP access. In one example, the APN is an IP Multimedia Subsystem (IMS) Access Point Name (APN).

Following block 410, in block 420, determine if a non-3GPP access is available. In one aspect, the availability of a non-3GPP access is known by receiving a signal indication that a non-3GPP access is available. However, many other processes are known for determining whether a non-3GPP access is available which can be used without affecting the scope and spirit of the present disclosure.

Following block 420, if a non-3GPP access is not available, no action is taken, and the UE continues to remain connected to the IMS APN via the 3GPP access unless the 3GPP access becomes unavailable. If a non-3GPP access is available, in block 430, determining at least one of the following: if the APN is specific to an IMS application being used or desired to be used or if an IP header of an IMS application flow matches a configured pattern. In one aspect, the IMS application is an application being used or desired to be used by a user equipment seeking the non-3GPP access. In one example, the IMS application is a multi-media service, such as but not limited to, a video conference, a movie download, a TV program, a podcast, etc. One skilled in the art would understand that various configured patterns may be used, for example, based on operational parameter(s), designer choice and/or specific application parameter(s) without affecting the spirit or scope of the present disclosure.

An access network discovery and selection function (ANDSF) per the 3GPP 23.402 specification, for example, may be used for determining if the APN is specific to the IMS application. In one example, a list of IMS applications specific to the APN is used by the determining step in block 430. One skilled in the art would understand that other processes can be used to determine if the APN is specific to an IMS application without affecting the scope or spirit of the present disclosure.

If the determination is yes in block 430, then in block 440, trigger an IMS Session Continuity (SC) flow through the non-3GPP access for the IMS application. In one example, triggering the IMS SC flow includes obtaining a new IP address from a public data network (PDN) connection to a second Access Point Name (APN). This second APN may or may not be the same as the APN that was determined to be specific to the IMS application.

Following block 440, in block 445, determine if the APN is specific to a second IMS application, and if yes, associate the IMS SC with the second IMS application. The step(s) of block 445 is repeated for all IMS applications. If the determination in block 430 is no, then in block 450, trigger an IP mobility flow through the non-3GPP access for the IMS application or a non-IMS application. In one example, the DSMIPv6 protocol is used to trigger the IP mobility flow through the non-3GPP access. In another example, define a data structure that includes a list of APNs having one or more APNs associated with the IMS SC flow and one or more APNs associated with the IP mobility flow. In other words, a user equipment may define a data structure with a list of APNs. The list of APNs may include one or more APN for which the IMS SC flow should be used and/or one or more APN for which IP mobility flow should be used.

In one example, non-3GPP access includes WiFi, wireless local access network (WLAN), Worldwide Interoperability for Microwave Access (WiMax), cdma2000, cdma 1xEVDO, etc., and 3GPP access includes Wideband Code Division Multiple Access (WCDMA), Universal Mobile Telecommunication System (UMTS), Long Term Evolution (LTE), Long Term Evolution-Advanced (LTE-A), etc.

One skilled in the art would understand that the steps disclosed in the example flow diagram in FIG. 4 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 5:
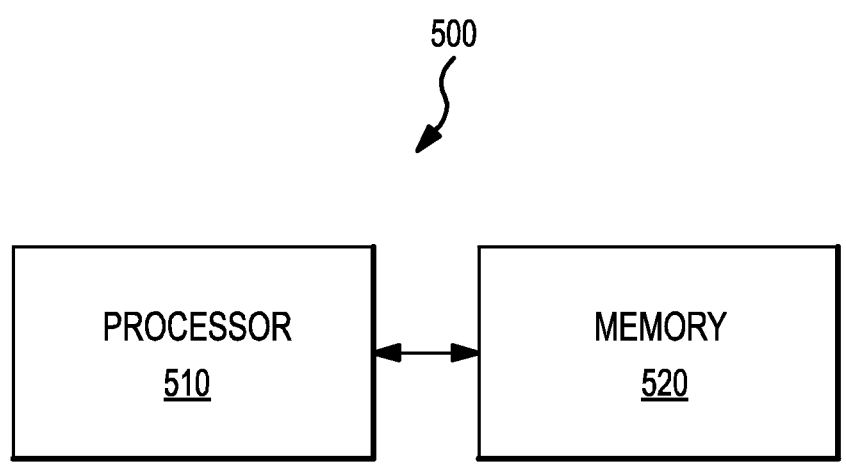
FIG. 5 illustrates an example of a device comprising a processor in communication with a memory for executing the processes for providing mobility to IP Multimedia Subsystem (IMS) sessions in a mobile (Internet Protocol) IP network.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 5 illustrates an example of a device 500 comprising a processor 510 in communication with a memory 520 for executing the processes for providing mobility to IP Multimedia Subsystem (IMS) sessions in a mobile (Internet Protocol) IP network. In one example, the device 500 is used to implement the algorithm illustrated in FIG. 4. In one aspect, the memory 520 is located within the processor 510. In another aspect, the memory 520 is external to the processor 510. In one aspect, the processor includes circuitry for implementing or performing the various flow diagrams, logical blocks and/or modules described herein.

Figure 6:
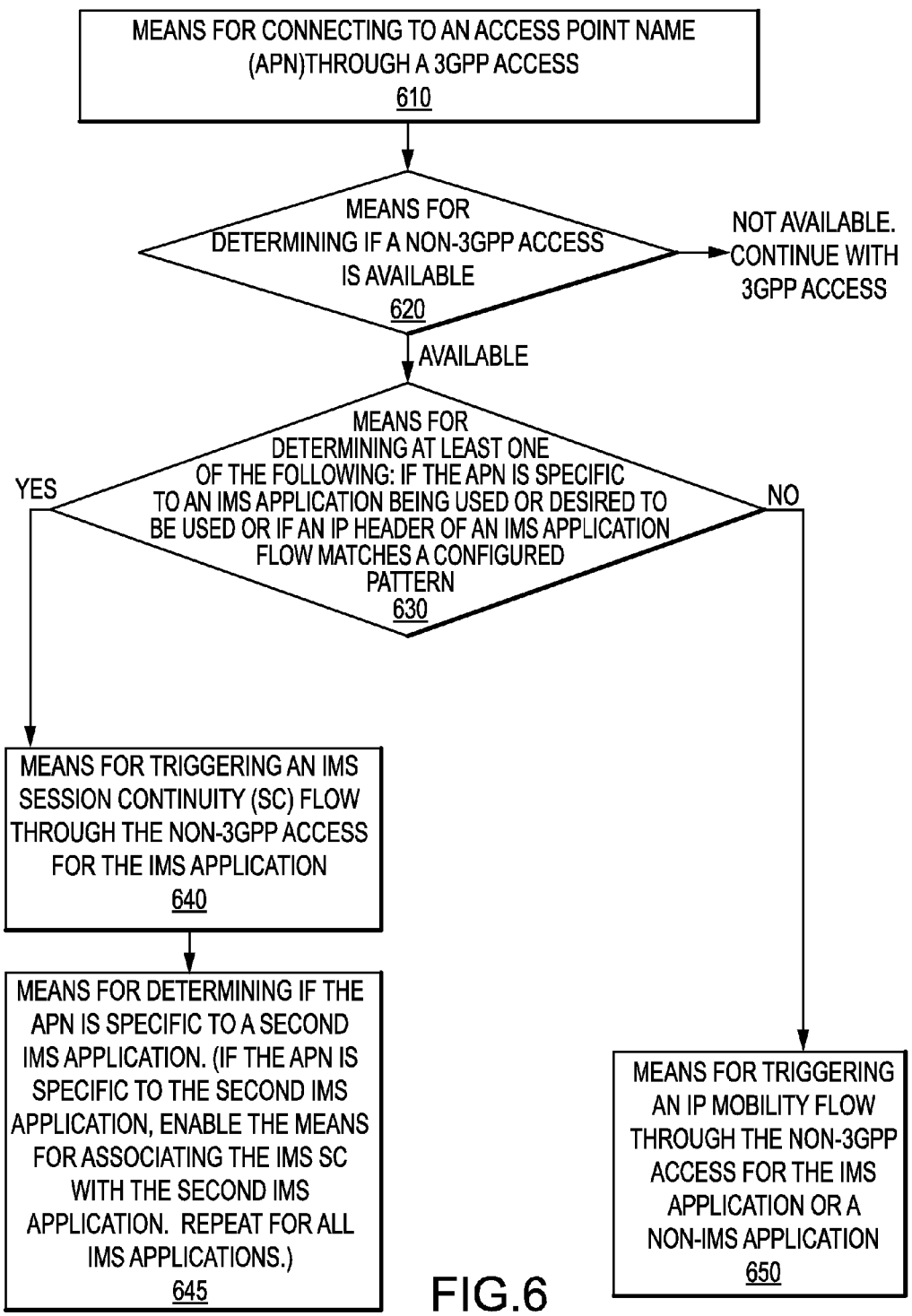
FIG. 6 illustrates an example of a device suitable for providing mobility to IP Multimedia Subsystem (IMS) sessions in a mobile (Internet Protocol) IP network.

FIG. 6 illustrates an example of a device 600 suitable for providing mobility to IP Multimedia Subsystem (IMS) sessions in a mobile (Internet Protocol) IP network. In one aspect, the device 600 is implemented by at least one processor comprising one or more modules configured to provide different aspects of mobility to IP Multimedia Subsystem (IMS) sessions in a mobile (Internet Protocol) IP network as described herein in blocks 610, 620, 630, 640, 645 and 650. For example, each module comprises hardware, firmware, software, or any combination thereof. In one aspect, the device 600 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for providing mobility to Internet Protocol (IP) Multimedia Subsystem (IMS) sessions in a mobile IP network, the method comprising:
   connecting to an Access Point Name (APN) through a 3GPP access;
   determining if a non-3GPP access is available;
   determining at least one of the following: if the APN is specific to an IMS application being used or desired to be used, or if an IP header of an IMS application flow matches a configured pattern; and
   performing one of the following:
   a) triggering an IMS Session Continuity (SC) flow through the non-3GPP access to provide mobility for the IMS application between the 3GPP access and the non-3GPP access based on one of the following: if the APN is specific to the IMS application or if the IP header of the IMS application flow matches the configured pattern; or
   b) triggering an IP mobility flow through the non-3GPP access to provide mobility for the IMS application or a non-IMS application between the 3GPP access and the non-3GPP access if the APN is not specific to the IMS application and if the IP header of the IMS application flow does not match the configured pattern.

2. The method of claim 1 further comprising using an access network discovery and selection function (ANDSF) for determining if the APN is specific to the IMS application.

3. The method of claim 1 wherein the determining step of if the non-3GPP access is available is based on a received signal indication that the non-3GPP access is available.

4. The method of claim 1 further comprising obtaining a new IP address from a public data network (PDN) connection to a second Access Point Name (APN) for triggering the IMS SC flow.

5. The method of claim 4 wherein a list of IMS applications specific to the APN is used for determining if the APN is specific to the IMS application.

6. The method of claim 5 further comprising determining if the APN is specific to a second IMS application.

7. The method of claim 1 further comprising using a DSMIPv6 protocol or a PMIPv6 protocol for triggering the IP mobility flow.

8. A user equipment for providing mobility to Internet Protocol (IP) Multimedia Subsystem (IMS) sessions in a mobile IP network, the user equipment comprising a processor and a memory wherein the memory containing program code executable by the processor for performing the following:
   connecting to an Access Point Name (APN) through a 3GPP access;
   determining if a non-3GPP access is available;
   determining at least one of the following: if the APN is specific to an IMS application being used or desired to be used, or if an IP header of an IMS application flow matches a configured pattern; and
   performing one of the following:
   a) triggering an IMS Session Continuity (SC) flow through the non-3GPP access to provide mobility for the IMS application between the 3GPP access and the non-3GPP access based on one of the following: if the APN is specific to the IMS application or if the IP header of the IMS application flow matches the configured pattern; or b) triggering an IP mobility flow through the non-3GPP access to provide mobility for the IMS application or a non-IMS application between the 3GPP access and the non-3GPP access if the APN is not specific to the IMS application and if the IP header of the IMS application flow does not match the configured pattern.

9. The user equipment of claim 8 wherein the memory further comprising program code for obtaining a new IP address from a public data network (PDN) connection to a second Access Point Name (APN) for triggering the IMS SC flow.

10. The user equipment of claim 9 wherein the second APN is the same as the APN.

11. The user equipment of claim 8 wherein the memory further comprising program code for using a DSMIPv6 protocol or a PMIPv6 protocol for triggering the IP mobility flow.

12. The user equipment of claim 8 wherein the APN is an IP Multimedia Subsystem (IMS) Access Point Name (APN).

13. The user equipment of claim 12 wherein the memory further comprising program code for using a list of IMS applications specific to the APN for determining if the APN is specific to the IMS application.

14. The user equipment of claim 8 wherein the memory further comprising program code for defining a data structure that includes a list of APNs having one or more APNs associated with the IMS SC flow or one or more APNs associated with the IP mobility flow.

15. An apparatus for providing mobility to Internet Protocol (IP) Multimedia Subsystem (IMS) sessions in a mobile IP network, the apparatus comprising:
   means for connecting to an Access Point Name (APN) through a 3GPP access;
   means for determining if a non-3GPP access is available;
   means for determining at least one of the following: if the APN is specific to an IMS application being used or desired to be used, or if an IP header of an IMS application flow matches a configured pattern; and
   means for performing one of the following:
      a) triggering an IMS Session Continuity (SC) flow through the non-3GPP access to provide mobility for the IMS application between the 3GPP access and the non-3GPP access based on one of the following: if the APN is specific to the IMS application or if the IP header of the IMS application flow matches the configured pattern; or
      b) triggering an IP mobility flow through the non-3GPP access to provide mobility for the IMS application or a non-IMS application between the 3GPP access and the non-3GPP access if the APN is not specific to the IMS application and if the IP header of the IMS application flow does not match the configured pattern.

16. The apparatus of claim 15 wherein the means for triggering the IMS SC flow further comprises means for obtaining a new IP address from a public data network (PDN) connection to a second Access Point Name (APN).

17. The apparatus of claim 15 wherein the means for triggering the IP mobility flow uses a DSMIPv6 protocol or a PMIPv6 protocol for triggering the IP mobility flow.

18. The apparatus of claim 15 wherein the IMS application is a multi-media service.

19. A non-transitory computer-readable medium storing a computer program, wherein execution of the computer program is for:
   connecting to an Access Point Name (APN) through a 3GPP access;
   determining if a non-3GPP access is available;
   determining at least one of the following: if the APN is specific to an IMS application being used or desired to be used, or if an IP header of an IMS application flow matches a configured pattern; and
   performing one of the following:
      a) triggering an IMS Session Continuity (SC) flow through the non-3GPP access to provide mobility for the IMS application between the 3GPP access and the non-3GPP access based on one of the following: if the APN is specific to the IMS application or if the IP header of the IMS application flow matches the configured pattern; or
      b) triggering an IP mobility flow through the non-3GPP access to provide mobility for the IMS application or a non-IMS application between the 3GPP access and the non-3GPP access if the APN is not specific to the IMS application and if the IP header of the IMS application flow does not match the configured pattern.

20. The non-transitory computer-readable medium of claim 19 wherein execution of the computer program is also for using an access network discovery and selection function (ANDSF) for determining if the APN is specific to the IMS application.

* * * * *